UNITED STATES PATENT OFFICE 2,617,792

DISPROPORTIONATION OF ROSIN ACIDS AND FATTY ACIDS

Don E. Floyd, Robbinsdale, Minn., assignor to General Mills, Inc., a corporation of Delaware No Drawing. Application September 5, 1950, Serial No. 183,286

9 Claims. (Cl. 260—97.5)

The present invention relates to the disproportionation of a mixture of unsaturated resin acids and unsaturated fatty acids by catalytic treatment. A process of disproportionation involves the redistribution of hydrogen atoms already present in the compounds of the mixture. In general, the abietic type resin acids of the mixture lose hydrogen by partial aromatization and the polyunsaturated acids of the mixture, principally linoleic and linolenic acids, gain hydrogen to form monoolefinic acids or saturated acids.

In earlier art in this field procedures are described in which disproportionation is conducted in an open vessel in the presence of a disproportionation catalyst while passing carbon dioxide through the reaction mixture to prevent oxidation. It has now been found that considerable decarboxylation occurs when disproportionation is conducted in an open vessel with or without carbon dioxide atmosphere. This leads to an increased unsaponifiable content in the product. Since unsaponifiable material is of little or no value in products of this type, this in effect amounts to a reduction in yield. Moreover the catalysts used have presented problems. In general, precious metal catalysts, such as palladium catalysts, have been employed since they increase the rate of reaction to a point where the reaction may be completed with less decarboxylation than is the case with catalysts which require a longer reaction time. These precious metal catalysts, however, are extremely expensive and the loss of even minor quantities of the catalyst through handling constitutes a substantial element of cost. Furthermore, these catalysts are readily poisoned by sulfur and there is usually found sufficient sulfur in tall oil to cause catalyst poisoning trouble.

Typical of these processes is the patent to George, 2,479,226, which discloses the disproportionation of a mixture of unsaturated rosin acids and fatty acids. While mention is also made of Raney nickel as a catalyst, the patentee obviously prefers the precious metal catalysts inasmuch as the examples describe the use of palladium. The reaction is carried out in an open vessel and the procedure is subject to the disadvantage previously mentioned, namely that notwithstanding the use of the precious metal catalyst, decarboxylation occurs to a substantial extent resulting in an increase in unsaponifiable material. Furthermore, the precious metal catalyst which is used is subject to poisoning by the small amount of sulfur contained in the tall oil.

Nickel catalysts have not been preferred for disproportionation of resin acids for the reason that the rate of reaction is so low that excessive decarboxylation occurs before the disproportionation is carried on to the desired extent.

It has now been discovered that disproportionation of resin acids may be carried out in the presence of nickel catalysts, either finely divided nickel such as nickel on kieselguhr, reduced nickel formate, or combined nickel such as nickel sulfide catalyst, without the disadvantages encountered heretofore. These catalysts are not readily poisoned by sulfur and consequently the activity of the catalyst is maintained for a much longer period of time than is the activity of the precious metal catalyst in the ordinary disproportionation procedure. This is accomplished by carrying out the disproportionation in a closed vessel under a positive carbon dioxide pressure.

The invention, therefore, comprises the disproportionation of a mixture of unsaturated rosin acids and unsaturated fatty acids in the presence of a nickel catalyst and under a positive carbon dioxide pressure. The invention is applicable to mixtures of rosin acids and unsaturated fatty acids in general. It may be applied to such mixtures containing a large quantity of rosin acids and only a minor quantity of unsaturated fatty acids, and to mixtures containing a large quantity of unsaturated fatty acids and only a minor quantity of resin acids, and also to mixtures between these extremes. One of the important uses, however, for these disproportionated products is as emulsion stabilizers in emulsion polymerization processes. For this purpose a "stabilized" disproportionated product is highly desirable.

The term "stabilized" is used herein to describe two different effects caused by disproportionation. The first effect is that of increased resistance to the action of many chemical reagents. It is well known that abietic type rosin acids and polyunsaturated fatty acids are particularly subject to decomposition, oxidation, and polymerization. The stabilized mixtures from which abietic type acids and polyolefinic acids have been removed by disproportionation are more resistant to decomposition, oxidation, and polymerization. Consequently they are more stable and superior for many purposes. It is important that an emulsifier be resistant to decomposition, oxidation, and polymerization in order that it retain its activity as well as its color and odor.

The second stabilization effect is closely related to the process of emulsion polymerization. Soaps of abietic type resin acids and polyunsaturated fatty acids are emulsifying agents. They are not suitable as emulsifiers for rubber polymerization because they are polymerization inhibitors. They interfere with polymerization reactions causing a very pronounced decrease in reaction rates. This inhibitory effect is very detrimental to synthetic rubber manufacture. Stabilization or removal of abietic type acids and polyunsaturated fatty acids by disproportionation eliminates the inhibitory effect. Consequently soaps of the disproportionated products are very useful emulsifiers for rubber polymerizations.

In order to produce such stabilized disproportionated mixtures therefore, it is necessary that sufficient abietic type rosin acids be present in the mixture to afford sufficient hydrogen to convert the polyunsaturated fatty acids at least to monoolefinic acids. Usually this requires a minimum of about 30% of rosin acids although the exact amount depends on the amount of polyolefinic acids. The monoolefinic acids are sufficiently stable as not to interfere with the polymerization process. An excess of rosin over that required to furnish the hydrogen for the reduction of the polyolefinic fatty acids may be present and such excess rosin acids are converted to stable compounds such as dehydroabietic acid and dihydroabietic acid. Usually at least 15% of fatty acids are present.

As was pointed out previously, the most readily available commercial source of a mixture of rosin acids and fatty acids is to be found in tall oil. In whole tall oil the rosin acid content may run from 30% to 50%, the remainder being essentially fatty acids and a very small quantity of unsaponifiable material. Such a mixture is suitable for the present process. It is quite common, however, to subject tall oil to a fractionation procedure for the recovery of a valuable fatty acid fraction and for the production of a rosin acid fraction. This rosin acid fraction frequently contains from about 60% to about 80% rosin acids with the remainder being composed essentially of fatty acids and a minor amount of unsaponifiable material. Such a rosin acid fraction of tall oil is particularly adapted for the present purposes.

In carrying out the process the mixture of rosin and fatty acids to be disproportionated is placed in an autoclave. This may be of steel or any ordinary metal where color in the final product is not important. The use of stainless steel, glass or other chemically resistant vessels is desirable in order to suppress formation of dark colored products. A suitable quantity of nickel catalyst is added to the mixture of rosin acids and fatty acids and a small quantity of Dry Ice may be added for the purpose of generating the carbon dioxide pressure necessary for satisfactory conduct of the process. The autoclave is then closed and heated to an elevated temperature.

Reaction temperatures within the range of 200–300° C. are suitable. Below 200° C. the reaction rate falls off rapidly and very little disproportionation occurs. Above 300° C. undesirable side reactions, such as decarboxylation, polymerization, and charring take place to such an extent that the process is not commercially desirable. A preferred operating temperature is around 250° C.

The reaction pressure may vary from 25 pounds per square inch upwards. A highly satisfactory operating pressure is around 200 pounds per square inch at which decarboxylation is successfully suppressed. There appears to be little advantage gained in using pressures in excess of 200 pounds per square inch, but such higher pressures do not appear to have any effect upon the reaction and can, therefore, be used if desired.

The reaction time required for complete disproportionation varies with the temperature of the reaction and the activity of the catalyst. In general, a preferred reaction temperature of 250° C., about 2 to 3 hours is sufficient to bring about virtually complete disproportionation.

The nickel catalysts which are suitable include the pyrophoric nickel catalysts (Raney nickel); reduced nickel salts and oxides such as nitrates, carbonates, formates, oxides, and the like, either unsupported or supported on carriers such as kieselguhr, earths, alumina, carbon, and the like; nickel sulfide catalysts prepared from these nickel catalysts or from nickel oxides by sulfiding, are also suitable.

*Example 1*

A mixture of 100 g. of a rosin fraction of distilled tall oil (containing 72.1% rosin acids, 4.2% unsaponifiable matter and 23.7% fatty acids) and 5 g. of pulverized nickel sulfide catalyst were placed in an open flask. The nickel sulfide catalyst had been prepared previously by passing hydrogen sulfide gas through a tube containing $\frac{3}{32}$ inch pelleted U. O. P. 50% nickel-on-kieselguhr hydrogenation catalyst at a temperature of 300° C. for five hours.

The reaction mixture was stirred and heated rapidly to 250° C. while carbon dioxide gas was slowly bubbled into it. This reaction temperature was maintained for three hours. Then the mixture was cooled to just below 100° C. and diluted with an equal volume of 95% ethanol. The catalyst was removed by decantation and filtration. The reaction product was slightly darker than the starting material, but otherwise, little changed in appearance.

However, the analysis showed that both abietic acid and linoleic acid were absent, whereas abietic acid had made up over one-half of the original rosin acid content and linoleic acid made up over one-half of the original fatty acid content of the starting material. Most of the abietic acid was converted to dehydroabietic acid by loss of hydrogen and most of the linoleic acid was converted to mono-olefinic fatty acids by gaining hydrogen. This was shown by spectral analysis.

Neither dehydroabietic acid nor the mono-olefinic fatty acids are polymerization inhibitors, while it is well known that both abietic and linoleic acids are polymerization inhibitors.

During the disproportionation reaction, just described, the content of unsaponifiable matter increased from 4.2% to 29.6%. When the reaction was repeated in a closed vessel, containing 200 p. s. i. of carbon dioxide pressure, only a very slight unsaponifiable content increase occurred (from 4.2% to 7.7%).

*Example 2*

A mixture of 300 g. of a rosin/fatty acid mixture from tall oil, containing 35.9% rosin acids, by analysis, and 15 g. of Raney nickel catalyst was sealed in a stainless steel autoclave along with 25 g. of Dry Ice. The mixture was agitated and heated to 250° C., while carbon dioxide gas was released until the pressure in the vessel was 50 p. s. i. at that temperature. After 3 hours at 250° C., the mixture was cooled and diluted with an equal volume of Skellysolve C hydrocarbon solvent. The catalyst was removed by decantation and filtration.

The reaction product was virtually free of abietic and linoleic acids, whereas the original material contained substantial amounts of both of these polymerization inhibitors. During the reaction, increase in the content of unsaponifiable matter was very slight (from 3.21% to 6.25%).

Example 3

The reaction described in Example 2 was repeated, substituting 300 g. of a rosin acid fraction of tall oil containing 67.1% rosin for the tall oil mixture previously used. The amount of catalyst, the $CO_2$ pressure, and the reaction conditions were the same as those used in the experiment described in the preceding example.

The catalyst was separated and the reaction product worked up as before. Spectral analysis indicated that both abietic acid and linoleic acid were absent, whereas abietic acid had constituted about one-half of the original rosin acid content and linoleic acid had constituted over one-half of the original fatty acid content of the starting material. Analysis indicated that most of the abietic acid had been converted to dehydroabietic acid and most of the linoleic acid had been converted to mono-olefinic fatty acids. The disproportionation caused the unsaponifiable content to increase only from 1.35% to 4.80% of the total product.

Example 4

200 grams of a rosin acid fraction of tall oil

| Product | Iodine No. | Percent Saturated Acids | Percent Linoleic Acid | Percent Linolenic Acid |
|---|---|---|---|---|
| Before disproportionation | 142.2 | 4.5 | 63.0 | 0 |
| After disproportionation | 76.5 | 20.8 | 0 | 0 |

Example 5

A series of reactions were run with a single charge of catalyst. The reagents were 400 g. of the rosin acid fraction described in Example 4, 20 g. of Raney nickel catalyst, and about 20 g. of Dry Ice. The reactants were placed in the order named, in a high pressure, stainless steel reaction vessel of 1 liter capacity. The mixture was agitated and heated rapidly to 250° C. and carbon dioxide was gradually released until the pressure was about 200 pounds per square inch at the reaction temperature. After a reaction period of about 3 hours, the mixture was cooled, the pressure released and about 300 ml. of 95% ethanol added. The solution was decanted from the bulk of the catalyst while warm, and traces of catalyst were removed by filtration. The solvent was removed from the filtrate and the residue is listed as product No. 1 in the table below. Another charge of the rosin acid fraction and Dry Ice was added to the recovered catalyst and the process repeated. The product thus obtained is labeled product No. 2. This was repeated twice more, and the products obtained are labeled product 3 and product 4. Thus a total of four preparations were made from the original amount of Raney nickel catalyst. The following table gives the properties of the four products obtained.

| Product No. | Color | Abietic Acid Content | Linoleic Acid Content | Dehydroabietic Acid Content | Percent Unsap. |
|---|---|---|---|---|---|
| 1 | (slight darkening) | (virtually none) | virtually none | Over 25% | 7.56 |
| 2 | do | do | do | do | 7.41 |
| 3 | do | <2% | do | About 25% | 7.08 |
| 4 | do | <2% | do | Over 25% | 6.56 | containing 72.1% rosin acids, 4.2% unsaponifiable material, and 23.7% fatty acids, more than one-half of which was linoleic acid, were introduced into a high pressure steel hydrogenation vessel of 1 liter capacity. To this were added 10 g. of pulverized 50% nickel on kieselguhr catalyst and 25 g. of Dry Ice. The hydrogenation vessel was closed and the mixture agitated and heated rapidly to 250° C. Carbon dioxide was gradually vented until the pressure was 200 pounds per square inch at the reaction temperature of 250° C. After a reaction period of 3 hours at this temperature, the reaction mixture was cooled, diluted with alcohol, and the catalyst removed by decantation and filtration. The product was slightly darker than the original rosin acid fraction, but was similar in other physical properties. Spectral analysis of the components indicated the virtual absence of abietic and linoleic acids. The mixture contained over 25% of dehydroabietic acid. The unsaponifiable content was 9.16%.

The effect of this treatment on the fatty portion of the product is shown by the following data obtained on the combined fatty portion of several products prepared as previously described.

Example 6

Products 1, 2, 3 and 4 of Example 5 were combined and a portion of the combined disproportionation products was converted to the sodium soap in the following manner. A solution of 75 g. of sodium hydroxide was dissolved in 272 g. of distilled water, and the solution maintained at about 50° C. in a 2-liter, 3-neck flask, fitted with a mechanical stirrer. The combined molten disproportionated products (678 g.) at about 100° C. were added slowly, and with stirring to the alkali solution. An amber-colored homogeneous soap paste or gel was obtained. Analysis showed it to contain 69.2% solids and to have an acid number of 11.1. The soap gel had an agreeable odor and could be handled without difficulty.

The above soap gel was used in an emulsion polymerization in the following way. A dilute solution was prepared from the soap gel by dissolving 33.6 g. of soap gel in 790 g. of water and adjusting the pH of the solution to 10.5 by dropwise addition of 10% alkali.

For comparison purposes a dilute solution was prepared from a commercial soap gel which is used for emulsion polymerization containing 70.8% solids, and having an acid number of 12.2, by dissolving 33.6 g. of soap gel in 790 g. of water and adjusting the pH of the solution to 10.5 by dropwise addition of 10% alkali.

Emulsion polymerization tests were made with the following high sugar 41° F. recipe.

| | |
|---|---|
| Soap | [1] 4.7 |
| Styrene | 29 |
| Butadiene | 71 |
| Cumene hydroperoxide | 0.15 |
| Tertiary $C_{12}$ mercaptan | 0.2 |
| Dextrose | 3.0 |
| $FeSO_4 \cdot 7H_2O$ | 0.105 |
| $Na_4P_2O_7$ | 0.6 |
| Water | 180 |

[1] Anhydrous basis.

In one batch the soap employed was the dilute soap solution prepared from the disproportionated rosin acid fraction described in Example 5, and in the other batch the soap employed was the dilute solution of the commercial soap gel described above. Each batch was divided in half for check purposes.

The polymerization was carried out as follows: The reactants were sealed in 8 ounce glass bottles and agitated at 41° F. for 15 hours. Samples were withdrawn by the customary hypodermic technique, t-butylhydroquinone added, volatile material evaporated off, and the residual rubber polymer weighed. Correction was made for the soap remaining in the polymer.

In the duplicate samples employing the dilute solution of the disproportionation products of Example 2, the conversion of monomer to polymer amounted to 71.6% and 72.5%. In the duplicate samples employing the commercial soap the conversion of monomer to polymer amounted to 63.1% and 63.2%.

I claim as my invention:

1. Process for the disproportionation of rosin acids in the presence of higher polyolefinic fatty acids, which comprises heating a mixture of rosin acids and polyolefinic higher fatty acids to a temperature in the range of 200–300° C. in the presence of a nickel hydrogenation catalyst and in the presence of carbon dioxide under at least 25 pounds per square inch pressure.

2. Process for the disproportionation of rosin acids in the presence of higher polyolefinic fatty acids, which comprises heating a mixture of rosin acids and polyolefinic higher fatty acids to a temperature of approximately 250° C. in the presence of a nickel hydrogenation catalyst and in the presence of carbon dioxide under a pressure of about 200 pounds per square inch for a period of from 2 to 3 hours.

3. Process for the disproportionation of rosin acids in the presence of higher poylolefinic fatty acids, which comprises heating a mixture of rosin acids and polyolefinic higher fatty acids containing from 30–85% rosin acids and the remainder principally higher fatty acids including polyolefinic higher fatty acids, to a temperature in the range of 200–300° C. in the presence of a nickel hydrogenation catalyst and in the presence of carbon dioxide under at least 25 pounds per square inch pressure.

4. Process for the disproportionation of rosin acids in the presence of higher polyolefinic fatty acids, which comprises heating a mixture of rosin acids and polyolefinic higher fatty acids containing from 60–80% rosin acids and the remainder principally higher fatty acids including polyolefinic higher fatty acids, to a temperature in the range of 200–300° C. in the presence of a nickel hydrogenation catalyst and in the presence of carbon dioxide under at least 25 pounds per square inch pressure.

5. Process for the disproportionation of rosin acids in the presence of higher polyolefinic fatty acids, which comprises heating a mixture of rosin acids and polyolefinic higher fatty acids containing from 30–50% rosin acids and the remainder principally higher fatty acids including polyolefinic higher fatty acids, to a temperature in the range of 200–300° C. in the presence of a nickel hydrogenation catalyst and in the presence of carbon dioxide under at least 25 pounds per square inch pressure.

6. Process for the disproportionation of rosin acids in the presence of higher polyolefinic fatty acids, which comprises heating a rosin fraction of tall oil containing from 60–80% rosin acids and the remainder principally higher fatty acids including polyolefinic higher fatty acids, to a temperature of about 250° C. in the presence of a nickel hydrogenation catalyst and in the presence of carbon dioxide under at least 25 pounds per square inch pressure for a period of from 2 to 3 hours.

7. Process for the disproportionation of rosin acids in the presence of higher polyolefinic fatty acids, which comprises heating a rosin fraction of tall oil containing from 60–80% rosin acids and the remainder principally higher fatty acids including polyolefinic higher fatty acids, to a temperature of about 250° C. in the presence of a Raney nickel catalyst and in the presence of carbon dioxide under at least 25 pounds per square inch pressure for a period of from 2 to 3 hours.

8. Process for the disproportionation of rosin acids in the presence of higher polyolefinic fatty acids, which comprises heating a rosin fraction of tall oil containing from 60–80% rosin acids and the remainder principally higher fatty acids including polyolefinic higher fatty acids, to a temperature of about 250° C. in the presence of a nickel on kieselguhr catalyst and in the presence of carbon dioxide under at least 25 pounds per square inch pressure for a period of from 2 to 3 hours.

9. Process for the disproportionation of rosin acids in the presence of higher polyolefinic fatty acids, which comprises heating a rosin fraction of tall oil containing from 60–80% rosin acids and the remainder principally higher fatty acids including polyolefinic higher fatty acids, to a temperature of about 250° C. in the presence of nickel sulfide catalyst and in the presence of carbon dioxide under at least 25 pounds per square inch pressure for a period of from 2 to 3 hours.

DON E. FLOYD.

REFERENCES CITED

The following references are of record in the file of this patent:

UNITED STATES PATENTS

| Number | Name | Date |
|---|---|---|
| 2,239,555 | Fleck et al. | Apr. 22, 1941 |
| 2,479,226 | George | Aug. 16, 1949 |